United States Patent
Castelli et al.

(10) Patent No.: US 10,318,246 B2
(45) Date of Patent: *Jun. 11, 2019

(54) SYSTEM, METHOD, AND RECORDING MEDIUM FOR VALIDATING COMPUTER DOCUMENTATION

(71) Applicant: International Business Machines Corporation, Armonk, NY (US)

(72) Inventors: Vittorio Castelli, Croton on Hudson, NY (US); Radu Florian, Danbury, CT (US); Taesun Moon, Scarsdale, NY (US); Avirup Sil, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,021

(22) Filed: Jan. 12, 2018

(65) Prior Publication Data

US 2018/0136908 A1    May 17, 2018

Related U.S. Application Data

(63) Continuation of application No. 15/241,407, filed on Aug. 19, 2016, now Pat. No. 10,042,613.

(51) Int. Cl.
| | |
|---|---|
| *G06F 9/44* | (2018.01) |
| *G06F 8/20* | (2018.01) |
| *G06F 11/36* | (2006.01) |
| *G06F 8/73* | (2018.01) |
| *G06F 17/21* | (2006.01) |

(52) U.S. Cl.
CPC .............. *G06F 8/20* (2013.01); *G06F 8/73* (2013.01); *G06F 11/36* (2013.01); *G06F 11/3604* (2013.01); *G06F 17/21* (2013.01)

(58) Field of Classification Search
CPC ........................................................ G06F 8/20
USPC .............. 717/101–103, 109–113, 136–137, 717/140–141
See application file for complete search history.

(56) References Cited

U.S. PATENT DOCUMENTS

| | | | | | |
|---|---|---|---|---|---|
| 4,688,195 | A | * | 8/1987 | Thompson | G06F 3/0489 706/11 |
| 4,829,423 | A | * | 5/1989 | Tennant | G06F 3/0489 704/8 |
| 5,111,398 | A | * | 5/1992 | Nunberg | G06F 17/274 704/6 |
| 5,418,716 | A | * | 5/1995 | Suematsu | G06F 17/274 704/2 |

(Continued)

OTHER PUBLICATIONS

Miyabe et al, "Accuracy Evaluation of Sentences Translated to Intermediate Language in Back Translation", ACM, pp. 30-35, 2009 (Year: 2009).*

(Continued)

*Primary Examiner* — Anil Khatri
(74) *Attorney, Agent, or Firm* — Rahan Uddin, Esq.; McGinn IP Law Group, PLLC

(57) ABSTRACT

A computer-implemented computer documentation validation method, system, and computer program product for discovering problems and errors in an entire set of program/software documentation written by humans and flagging the documentation errors to suggest corrections to humans.

19 Claims, 5 Drawing Sheets

(56) References Cited

U.S. PATENT DOCUMENTS

| | | | |
|---|---|---|---|
| 6,233,545 B1 * | 5/2001 | Datig | G06N 3/004 704/2 |
| 6,341,372 B1 * | 1/2002 | Datig | G06N 3/004 715/234 |
| 6,701,294 B1 * | 3/2004 | Ball | G06F 17/30392 704/257 |
| 6,993,473 B2 | 1/2006 | Cartus | |
| 7,480,619 B1 * | 1/2009 | Scott | 704/275 |
| 7,587,668 B2 | 9/2009 | Bala | |
| 7,668,718 B2 | 2/2010 | Kahn et al. | |
| 7,895,030 B2 | 2/2011 | Al-Onaizan et al. | |
| 8,145,472 B2 * | 3/2012 | Shore | G06F 17/289 704/2 |
| 8,176,422 B2 | 5/2012 | Bergman et al. | |
| 8,347,276 B2 * | 1/2013 | Schadow | G06F 8/20 715/239 |
| 8,429,629 B2 * | 4/2013 | Drepper | G06F 9/45537 713/164 |
| 8,725,496 B2 | 5/2014 | Zhao et al. | |
| 8,903,707 B2 | 12/2014 | Zhao et al. | |
| 9,135,297 B2 * | 9/2015 | Maman | G06F 17/30427 |
| 9,189,254 B2 * | 11/2015 | Kushman | G06F 9/453 |
| 9,361,086 B1 | 6/2016 | Garratt et al. | |
| 9,471,559 B2 | 10/2016 | Castelli et al. | |
| 2015/0088589 A1 | 3/2015 | Marin et al. | |

OTHER PUBLICATIONS

Nelken et al, "Querying Temporal Databases Using Controlled Natural Language", ACM, pp. 1076-1080, 2000 (Year: 2000).*

Somers et al, "Machine Translation without a source text", ACM, pp. 271-276, 1990 (Year: 1990).*

Song et al, "Translation of Natural Language ery Into Keyword Query Using a RNN Encoder-Decoder", ACM, pp. 965-968, 2017 (Year: 2017).*

Nishida et al, "Hierarchical Meaning Representation and Analysis of Natural Language Documents", ACM, pp. 85-92, 1980 (Year: 1980).*

Butting et al, "Translating Grammars to Accurate Metamodels", ACM, pp. 174-186, 2018 (Year: 2018).*

United States Office Action dated Nov. 30, 2017 in U.S. Appl. No. 15/241,407.

United States Office Action dated Aug. 28, 2017, 2017 in U.S. Appl. No. 15/241,407.

Tucker, "A Persepctive on Machine Translation: Theory and Practice", Communications of the ACM, vol. 27, No. 4, pp. 322-329, 1984.

Gao, et al. "A Trainable Approach for Multi-Lingual Speech Translation System", ACM, pp. 231-234, 2002.

Mel, et al. "The NIST Definition of Cloud Computing". Recommendations of the National Institute of Standards and Technology. Nov. 16, 2015.

* cited by examiner

SYSTEM, METHOD, AND RECORDING MEDIUM FOR VALIDATING COMPUTER DOCUMENTATION

CROSS-REFERENCE TO RELATED APPLICATIONS

The present application is a Continuation Application of U.S. patent application Ser. No. 15/241,407, filed on Aug. 19, 2016, the entire contents of which are hereby incorporated by reference.

BACKGROUND

The present invention relates generally to a computer documentation validation method, and more particularly, but not by way of limitation, to a system, method, and computer program product for discovering problems and errors in an entire set of program/software documentation written by humans and flagging the documentation errors to suggest corrections to humans.

Commercial software for programs or web-based applications requires extensive documentation from the vendor so that users may engage productively with the software. However, when this documentation is poorly written, it can mislead or prevent the user from using the software to its full capacity, thus harming the user experience. Software documentation can run into the hundreds or thousands of pages and require standard quality control measures by humans that can significantly add to the cost of creating and maintaining such documentation.

Some conventional techniques consider parsing one or more product installation documents to identify annotations associated with installation procedures. Installation procedure descriptions, parameters, and prerequisites associated with the identified annotations are extracted, and prescriptive step-by-step installation instructions that integrate installation procedures contained within the one or more installation documents are generated. However, these techniques apply to documentation for installing software and the goal to extract a set of step-by-step instructions from the installation documentation rather than errors in the documentation itself.

Other conventional validation techniques relate to computer-generated documentation files being tested to determine if the computer-generated files are executable. However, these exemplary techniques are much different from a technique required for human generated documentation.

Conventional techniques require humans to exhaustively check the entire content of the documentation for errors instead of focusing on portions that are identified to have errors. That is, the conventional techniques are disadvantageous because an expansive and costly human resource department (or the like) is conventionally required by companies to test the computer documentation for errors.

SUMMARY

In an exemplary embodiment, the present invention can provide a computer-implemented computer documentation validation method, the method including translating a natural language of a computer software documentation into a machine instruction, detecting an error in the computer software documentation during an execution of the machine instruction on a software for the computer software documentation, and highlighting a location in the computer software documentation including the error detected by the detecting.

One or more other exemplary embodiments include a computer program product and a system.

Thereby, the exemplary embodiments described above may provide an intelligent, automated technique of checking computer documentation against the software it was created for and flagging documentation errors to suggest corrections to humans, thus providing the advantageous contribution to the art of removing the need for humans to exhaustively check the documentation and allow them to only focus on the parts that are incorrect or problematic.

Even further, in an optional embodiment, the machine instruction may include a back pointer indicating the location in the computer software documentation from which the machine instruction is translated.

Thus, when an error is detected, the exemplary embodiment may provide the advantage of expediting correction procedures of the error by indicating a location of the error for a human to correct.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
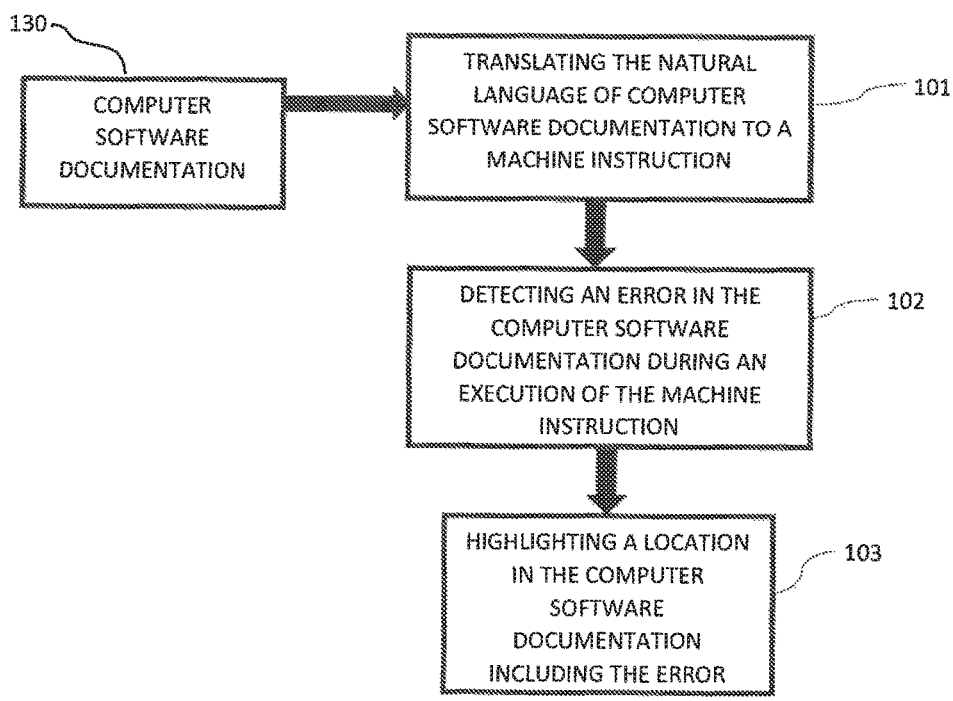
FIG. 1 exemplarily shows a high-level flow chart for a computer documentation validation method 100.

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the computer documentation validation method 100 includes various steps to learn, for a given piece of software and documentation, a translator from natural language to machine instruction, to execute the machine instructions to detect errors in the software documentation, and to create a back pointer indicating the portion of the documentation causing the errors. That is, the method 100 includes various steps to automatically validate documentation of computer-based procedures and to identify parts of the documentation that are underspecified, ambiguous, and/or incorrect. As shown in at least FIG. 2, one or more computers of a computer system 12 according to an embodiment of the present invention can include a memory 28 having instructions stored in a storage system to perform the steps of FIG. 1.

Thus, the computer documentation validation method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101 the natural language of computer software documentation 130 (e.g., human written text) is translated to a machine instruction. A machine instruction comprises manipulating the user interface of the operating system itself by taking control of, for example, a mouse or a keyboard (e.g., a user input device) to execute a command based on the natural language of the computer software documentation on behalf of the user. For example, if the natural language of the computer software documentation included the text "click on the drop down menu of the tab titled "edit"", the command of the natural language is translated to a machine instruction in step 101 by taking control of the mouse to click on the tab titled "edit". That is, the machine instruction required to cause the mouse cursor to move from the current location to the tab titled "edit" location in order to execute the instructions of the natural language of the computer software documentation can be learned in step 101.

Thus, the natural language of the computer software documentation is translated in step 101 to a machine instruction for a peripheral of a computer to execute the machine instruction just as if a human is following the natural language text instructions. The machine instructions do not alter the software coding of the peripherals but instead takes control of the peripherals to cause the peripherals to execute the machine instruction. Thus, the invention does not change the target software coding.

In some embodiments, in step 101, the natural language of the computer software documentation for a program is read and translated into machine interpretable sequences of instructions by ingesting the natural language of the computer software documentation embedded in a structured markup (e.g., such as an XML format), processing the document through a natural language processing pipeline (e.g. tokenization, tagging, parsing, mention detection), and translating the processed documentation into a set of machine instructions which have individual back pointers to the source natural language instructions. The back pointers map which part of the computer software documentation was translated to the machine instruction such that the source of the error can be easily found (e.g., as described later).

In step 101, a first component (e.g., such as a program module 42 depicted in FIG. 2) may learn, for a given piece of software and documentation, a translator from natural language to machine instructions and to cause a second component to build. The learning in step 101 may be performed over multiple sessions by learning how to map natural language to machine instructions, a background model that adds robustness to the general learning process for the agent. Thus, the first component can learn such that it can even learn how to translate short documentation to machine instructions.

In some embodiments, in step 101, natural language may be automatically translated into machine instructions by using a reinforcement learning agent that learns through an iterative process of repeatedly engaging the target software through the machine instructions that are generated by its own intermediate translation model where the engagement occurs within the environment by executing the machine instructions returned by the agent and through receiving a reward/feedback from the environment each time a machine instruction is executed according to what the agent generated. By repeating the translation in step 101, the cycle of translating natural language to machine instruction according to a model to have the environment execute a machine instruction can receive a reward corresponding to successful or unsuccessful execution of the machine instruction in order to refine the model and/or stop repeating when the model converges or a sufficient number of iterations have been executed.

In some embodiments, the translating to machine instructions in Step 101 may be made robust by learning a background agent that accumulates the models learned by all agents over different software and documentation pairs, adapts this set of models to a new software and documentation pair that has not been encountered yet, incorporates adapted models into a background model, or the like.

In step 102, the machine interpretable instructions generated in Step 101 are executed in relation to the software program that the computer software documentation 130 was written for. In some embodiments, failures (e.g., errors) are detected in the machine instructions. By way of example only, such errors include captured exceptions, sustained inactivity in the target software program, anomalies in the execution, etc.

In step 102, we will assume for example that an error in the computer software documentation 130 is detected (e.g., the natural language written version) based on an error occurring during an execution of the machine instruction in step 101. In other words, in step 102, an error in the human written software documentation can be identified by detecting an error occurring when a machine instruction, corresponding to the human written software documentation, is executed.

In step 103, a location in the computer software documentation 130 including the detected error in Step 102 can be highlighted. By way of example only, such highlighting can be achieved via a back pointer created in Step 101. That is, in step 101 a back pointer can be created for each of the translated machine instructions to the natural language of the computer software documentation, and, in step 103, the back pointer is highlighted for the portion of the natural language that the error is detected for when the machine instructions was executed. In other words, in case of an error being detected in step 102, the back pointer at the location of the computer software documentation may be highlighted in step 103 such that the error can be back-traced to the failed instruction of the original documentation and highlighting portions of the original natural language documentation such that remedial action may be taken.

In other words, anomalies can be noted in step 103, by tracing the machine instructions back to the source natural language text, and highlighting the offending section of the documentation. In some embodiments, a documenter may be notified to take remedial action.

Some embodiments of the invention include features that reduce the time and costs associated with manual computer software documentation 130 review by enabling a human reviewer to focus on sections of the computer software documentation 130 identified as including an error.

It is noted that although some examples herein are directed to client-focused software products such as Adobe, Microsoft Office, etc., the invention is not limited thereto. That is, the software documentation can include web-based software products such as Gmail, Facebook, etc. as well as smartphone applications, and Software as a Service (SaaS) applications.

The process software for method 100 for Software as a Service (SaaS) applications is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5:
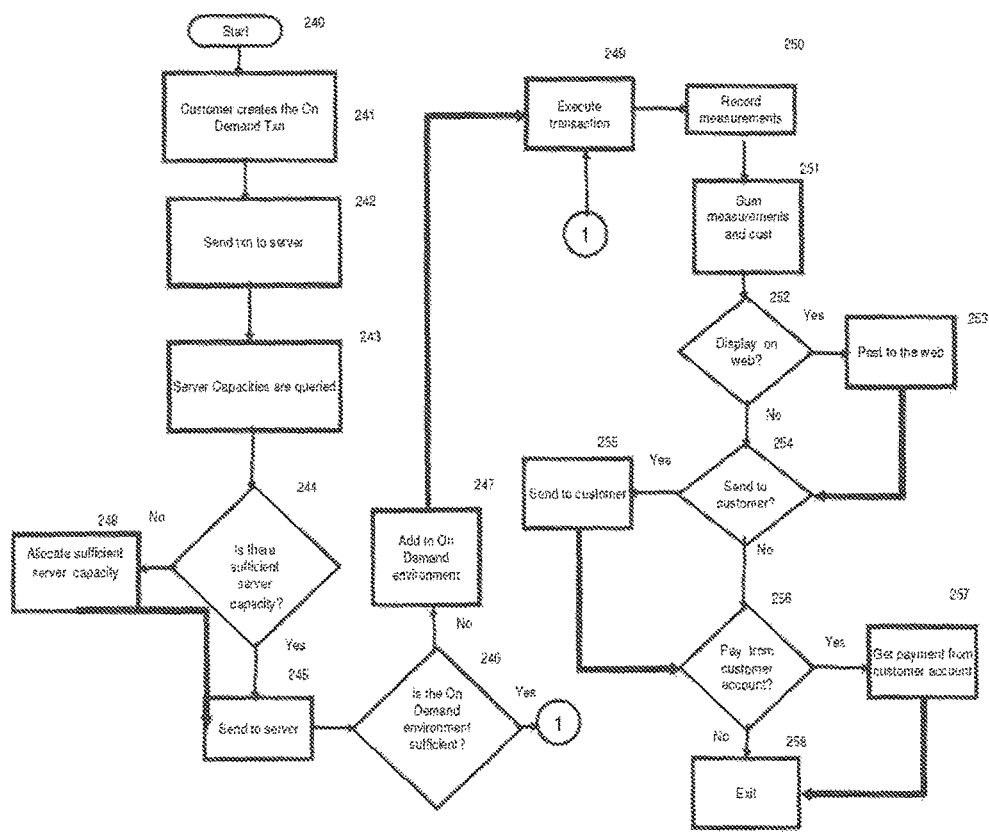
FIG. 5 exemplarily shows a high-level flow chart for an on demand method of a Software as a Service (Saas) application.

With reference now to the example depicted in FIG. 5, step 240 begins the On Demand process. A transaction is created that contains the unique customer identification, the requested service type, and any service parameters that further specify the type of service (241). The transaction is then sent to the main server (242). In an On Demand environment, the main server can initially be the only server, and then as capacity is consumed other servers are added to the On Demand environment.

The server central processing unit (CPU) capacities in the On Demand environment are queried (243). The CPU requirement of the transaction is estimated, and then the server's available CPU capacity in the On Demand environment is compared to the transaction CPU requirement to see if there is sufficient CPU available capacity in any server to process the transaction (244). If there is not sufficient server CPU available capacity, then additional server CPU capacity is allocated to process the transaction (248). If there was already sufficient available CPU capacity, then the transaction is sent to a selected server (245).

Before executing the transaction, a check is made of the remaining On Demand environment to determine if the environment has sufficient available capacity for processing the transaction. This environment capacity consists of such things as, but not limited to, network bandwidth, processor memory, storage etc. (246). If there is not sufficient available capacity, then capacity will be added to the On Demand environment (247). Next the required software to process the transaction is accessed, loaded into memory, and then the transaction is executed (249).

The usage measurements are recorded (250). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (251).

If the customer has requested that the On Demand costs be posted to a web site (252), then they are posted thereto (253). If the customer has requested that the On Demand costs be sent via e-mail to a customer address (254), then they are sent (255). If the customer has requested that the On Demand costs be paid directly from a customer account (256), then payment is received directly from the customer account (257). On Demand process proceeds to 258 and exits.

That is, embodiments of the present invention are applicable to web-based software/smart phone applications, SaaS applications, and locally installed software such as MS Office.

Thus, some embodiments of the invention have realized an exemplary technical solution to one of the technical needs in the art by providing an intelligent, automated technique of checking computer documentation against the software it was created for and flagging documentation errors to suggest corrections to humans, thus removing the need for humans to exhaustively check the documentation and allow them to only focus on the parts that are incorrect or problematic.

Therefore, by way of highlighting a location in the computer software documentation including the detected error such as in some optional embodiment by creating back pointers to the errors in the documents, the embodiments described herein may provide a technical solution to reduce extensive human review of tens of thousands of pages of computer documentation that can cost corporations millions of dollars (e.g., reducing quality control department requirements to review the documents) by greatly reducing the overall review time and focusing only on portions of the documentation with errors.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
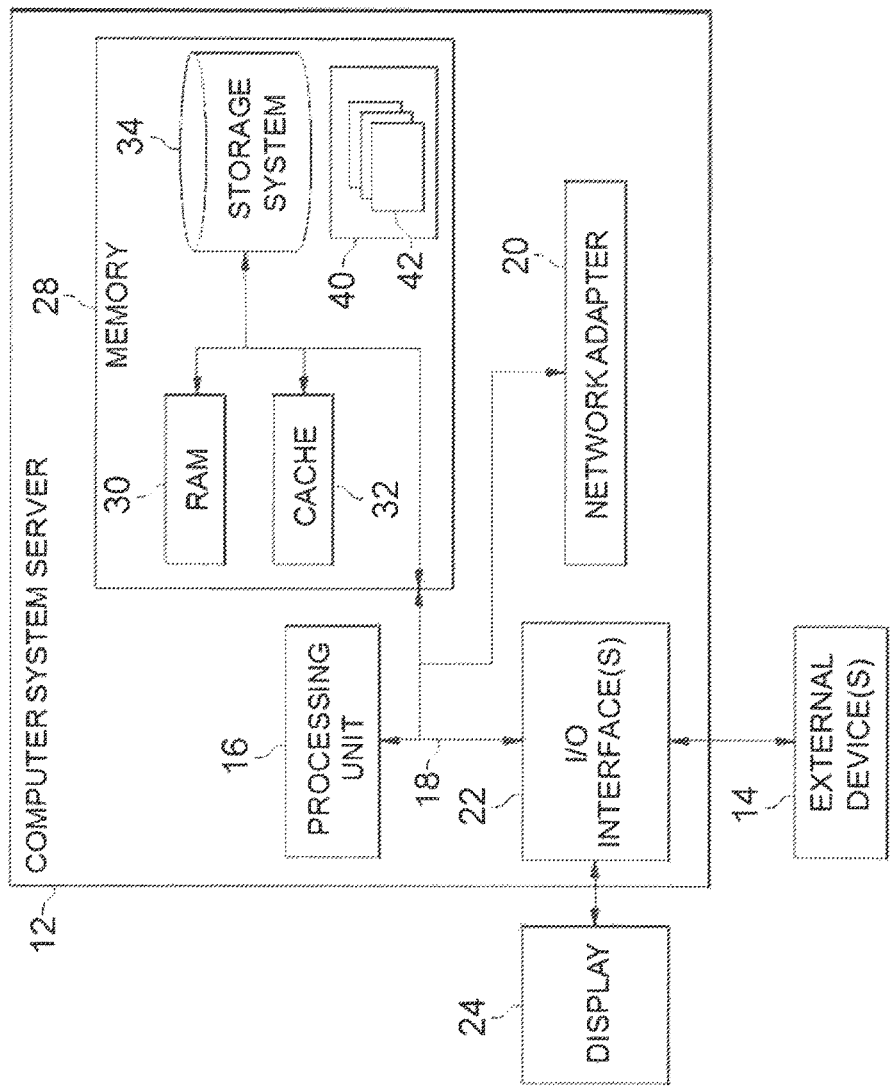
FIG. 2 depicts a cloud computing node according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
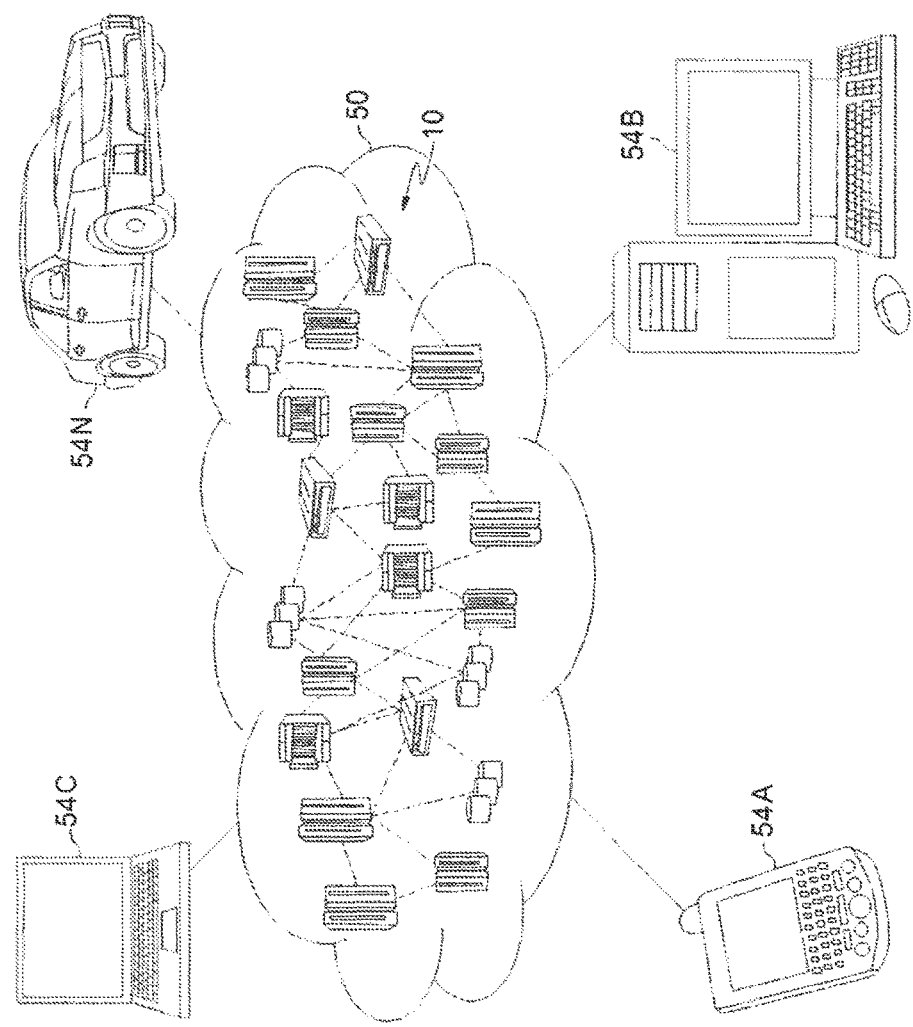
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
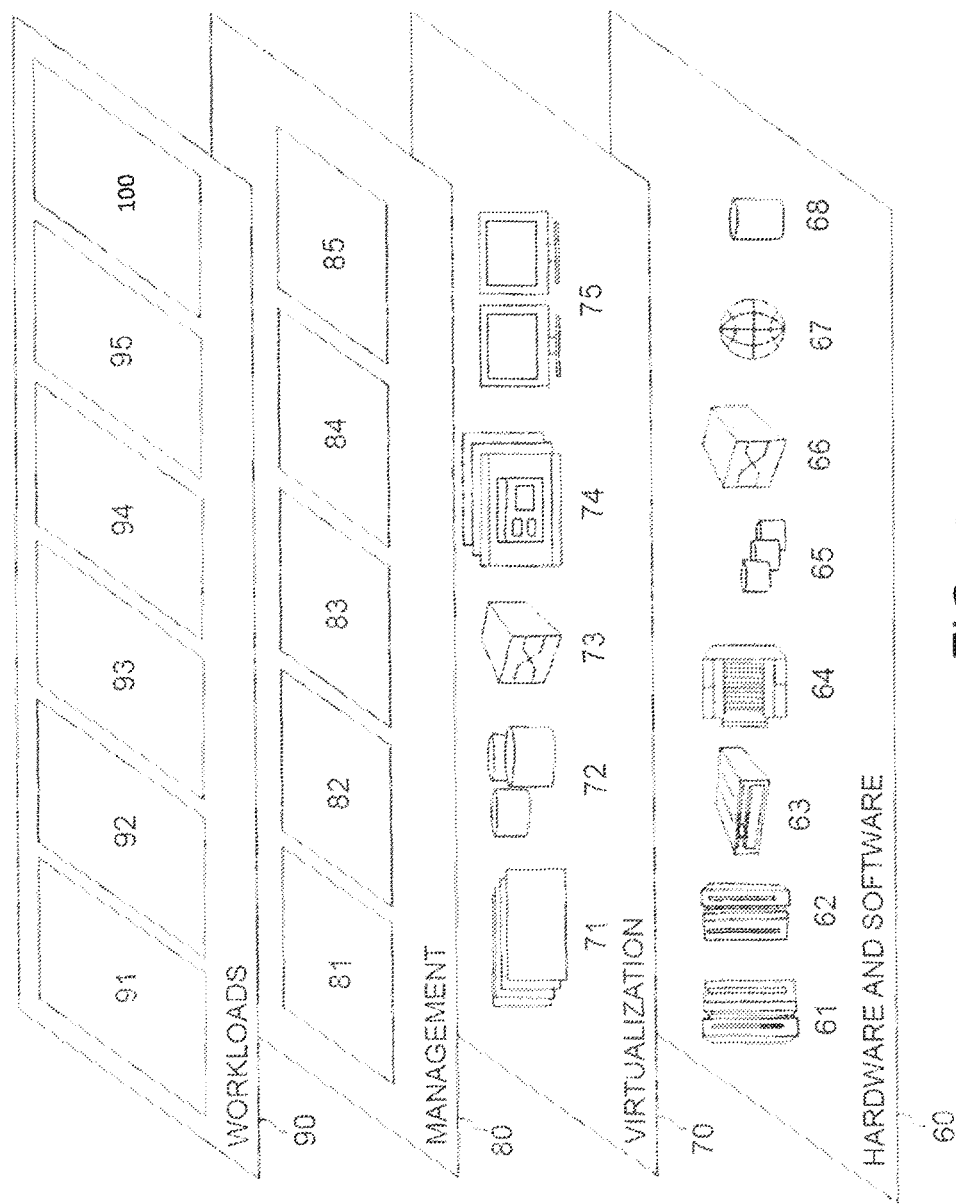
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the computer documentation validation method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented computer documentation validation method, the method comprising:
    translating a natural language of a computer software documentation into a machine instruction that manipulates a user interface of an operating system by taking control of a user input device to execute a command based on the natural language of the computer software documentation on behalf of the user;
    executing the translated machine instruction on a software product configured for the computer software documentation; and
    highlighting a location in the computer software documentation where an error occurs during the executing the translated machine instruction,
    wherein the machine instruction includes a back pointer indicating the location in the computer software documentation from which the machine instruction is translated, and
    wherein the error comprises a failure in the natural language of the computer software documentation being executed as the machine instruction.

2. The computer-implemented method of claim 1, wherein the natural language of the computer software documentation comprises text written by a human.

3. The computer-implemented method of claim 1, wherein the translating translates the computer software documentation into the machine instruction by processing the computer software documentation through a natural language processing pipeline.

4. The computer-implemented method of claim 3, wherein the natural language processing pipeline process is selected from a group consisting of:
    tokenization;
    tagging;
    parsing; and
    mental detection.

5. The computer-implemented method of claim 1, wherein the translating performs the translating by a reinforcement learning agent that learns an accuracy of the translating through an iterative process of repeatedly executing the machine instruction on the software that has been previously translated.

6. The computer-implemented method of claim 5, wherein the highlighting highlights the back pointer when the detecting detects the error such that the location of the error can be back traced by a human.

7. The computer-implemented method of claim 5, wherein the executing occurs within an environment by executing each of the machine instructions as a model returned to the reinforcement learning agent, and
    wherein the reinforcement learning agent receives feedback from the environment each time the model of the machine instruction is executed such that the accuracy is learned from multiple executions of the translated machine instruction.

8. The computer-implemented method of claim 7, wherein the reinforcement agent repeats the execution of the machine instruction to receive additional feedback to refine the accuracy of the translating, and
    wherein the reinforcement learning agent stops repeating the execution of the machine instruction when the machine instruction converges in the environment or a predetermined number of iterations of the reinforcement learning agent has occurred.

9. The computer-implemented method of claim 7, wherein the translating is made more robust by learning a background agent that:
    accumulates each model for a plurality of different software and computer software documentation pairs;
    adapts the accumulated set of models to a new software and computer software documentation pair; and
    incorporates the adapted models into a background model for the new software and computer software documentation pair.

10. The computer-implemented method of claim 1, wherein the software comprises software that the computer software documentation was written for by a human.

11. The computer-implemented method of claim 1, wherein the error comprises:
    a captured exception in the execution of the machine instruction; and
    a sustained inactivity in the software during the execution of the machine instruction.

12. The computer-implemented method of claim 1, embodied in a cloud-computing environment.

13. The method of claim 1, wherein the back pointers includes which part of the computer software documentation was translated to the machine instruction such that the source of an error is identified.

14. A computer program product for computer documentation validation, the computer program product comprising a computer readable storage medium having program instructions embodied therewith, the program instructions executable by a computer to cause the computer to perform:
    translating a natural language of a computer software documentation into a machine instruction that manipulates a user interface of an operating system by taking control of a user input device to execute a command based on the natural language of the computer software documentation on behalf of the user;

executing the translated machine instruction on a software product configured for the computer software documentation; and highlighting a location in the computer software documentation where an error occurs during the executing the translated machine instruction, wherein the machine instruction includes a back pointer indicating the location in the computer software documentation from which the machine instruction is translated, and wherein the error comprises a failure in the natural language of the computer software documentation being executed as the machine instruction.

15. The computer program product of claim 14, wherein the natural language of the computer software documentation comprises text written by a human.

16. The computer program product of claim 14, wherein the translating performs the translating by a reinforcement learning agent that learns an accuracy of the translating through an iterative process of repeatedly executing the machine instruction on the software that has been previously translated.

17. The computer program product of claim 14, wherein the natural language processing pipeline process is selected from a group consisting of:
tokenization;
tagging;
parsing; and
mental detection.

18. A computer documentation validation system, said system comprising:
a processor, and
a memory, the memory storing instructions to cause the processor to:
translating a natural language of a computer software documentation into a machine instruction that manipulates a user interface of an operating system by taking control of a user input device to execute a command based on the natural language of the computer software documentation on behalf of the user;

executing the translated machine instruction on a software product configured for the computer software documentation; and highlighting a location in the computer software documentation where an error occurs during the executing the translated machine instruction, wherein the machine instruction includes a back pointer indicating the location in the computer software documentation from which the machine instruction is translated, and wherein the error comprises a failure in the natural language of the computer software documentation being executed as the machine instruction.

19. The system of claim 18, embodied in a cloud-computing environment.

* * * * *